Feb. 11, 1930.  C. J. HUG  1,746,858
WHEEL
Filed Dec. 24, 1927
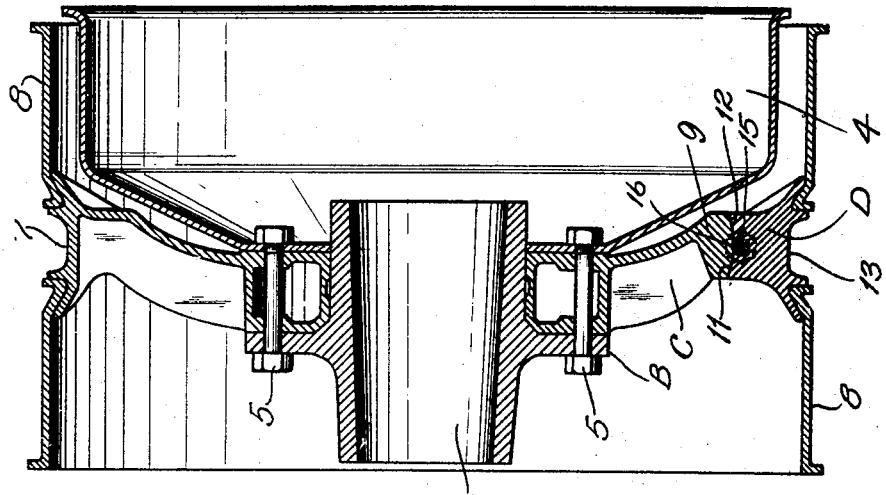
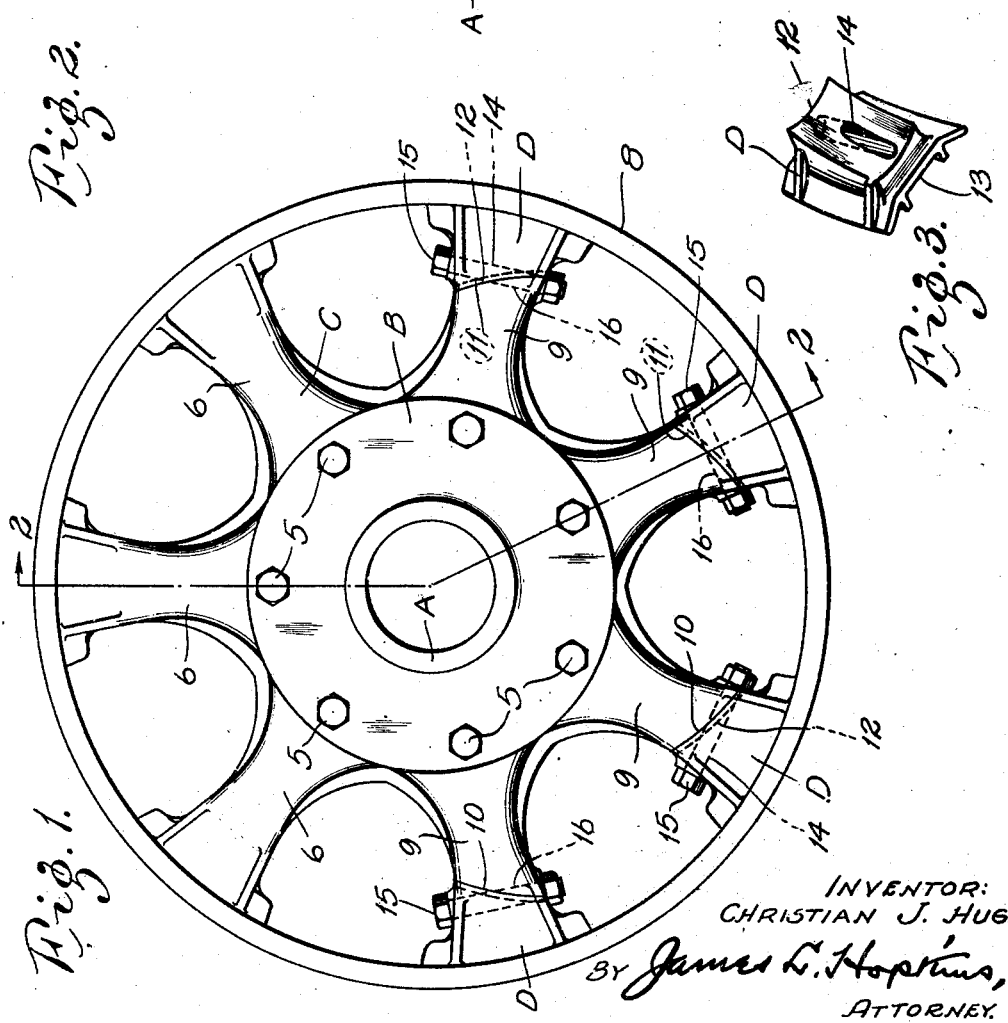
INVENTOR:
CHRISTIAN J. HUG.
By James L. Hopkins,
ATTORNEY.

Patented Feb. 11, 1930

1,746,858

UNITED STATES PATENT OFFICE

CHRISTIAN J. HUG, OF HIGHLAND, ILLINOIS

WHEEL

Application filed December 24, 1927. Serial No. 242,444.

My invention relates to improvements in wheels and consists of a spider type of wheel, having a cast hub provided with a peripheral flange arranged to detachably receive the spider member and brake-drum; the tire rim being mounted upon a spider member by means including a sufficient number of wedge-members to permit the ready withdrawal of the rim from the wheel by the removal of a sufficient number of said wedges.

Such detachable mounting of said rims is accomplished by means of a construction of the cast spoke member comprising a series of full length spokes, in combination with a larger number of stub-spokes, having their outer terminals obliquely beveled with relation to the path of travel of the wheel, the remainder of such stub-spokes being in the form of a wedge, each wedge being arranged to be mounted upon its corresponding stub-spoke by means of a bolt.

Another feature of my invention relates in the rounded convex contour of the outer terminal of each of the stub-spokes, with a concave inner face in the corresponding wedge permitting a forward and backward locking movement of the wedge upon its stub-spoke base during the process of mounting the tire, to facilitate such mounting.

A purpose of the entire solid spokes is to permit such solid spokes to accurately center the rim or rims so that said rim or rims will be in accurate alinement with the stub-spokes, upon which stub-spokes the mounting is accomplished by means of the wedges, and the bolting of said wedges in place.

A distinctive feature of my invention resides in the fact that the bolts securing the wedges to the outer terminals of the stub-spokes, as well as the wedges, are arranged in alinement with the path of travel of the wheel.

Drawings

In the drawings,—

Fig. 1 is a side elevation of a structure embodying my invention.

Fig. 2 is a transverse section of the same taken on the line 2—2 of Fig. 1.

Fig. 3 is a perspective view of one of the wedges employed in my construction.

Description

As shown in the drawings, I employ a hub A having the peripheral flange B to which the cupped brake-drum 4 and the spider C are fixed by means of bolts 5.

As shown in Fig. 1, the spider C embraces three complete spokes 6, each of said spokes 6 being contoured upon its outer face as shown at 7 (Fig. 2) to receive the tire rims 8.

The spider C also includes four stub-spokes 9, each of which has its outer face obliquely beveled as indicated by the numeral 10 (see Fig. 1).

The stub-spokes 9 are arranged in pairs, as shown in Fig. 1, the terminals of each pair of said spokes 9 being beveled in the same direction, the terminals of the two pairs being beveled in opposite directions; this is for the purpose of permitting the wedges D to be inserted in a downward direction, when the wheel is in the position shown in Fig. 1, and that position is the one to which the wheel is intended to be adjusted before the removal or replacement of the tire rims.

Each of the stub-spokes 9 has its outer face convexed, transversely of the wheel structure, as shown at 11, and each of the wedges D has its inner face concaved as indicated by 12, so as to rock inwardly and outwardly when placed in engagement with the convex face 11 of the spoke 9, during the process of securing engagement of the outer face 13 of the wedges D during the process of mounting the rims 8—8. The outer face 13 of each of the wedges D is contoured precisely the same as the outer faces 7 of the full length spokes 6 (see Fig. 2).

Each of the wedges D is provided with a suitable bore 14, as shown in Fig. 3, to accommodate the bolt 15, the stub-spokes 9 having a corresponding bore 16 for the reception of said bolt 15.

Mode of operation

When it is desired to remove the rims 8 the wheel is brought to the position shown in Fig. 1, the wedges D are released from their seats on the stub-spokes 9 by the removal of the bolts 15. The four wedges D being thus removed, the rims 8 are readily unseated from their engagement with the outer face 7 of the full length spokes 6. The rims 8 are then reseated, the wedges D restored to their places on the outer ends of the stub-spokes 9 and are there locked by the replacement of the bolts 15.

The full length spokes 6 are grouped together as shown in Fig. 1, and should be sufficient in number to permit the accurate centering of the rims 8 before said rims 8 are located in place by the insertion of the wedges D.

While I have illustrated a rim construction composed of dual-tire rims, a single rim may be mounted with equal facility if desired.

Variations of the described and illustrated structure may be made without departure from my actual invention as defined in the appended claim.

The concaved and curved beveled inner faces of the wedges D co-operate with the convex curved faces 11 of the stub-spokes 9 to accomplish the proper centering of those elements in relation to each other, enabling the bolts 15 to secure the proper alinement and locking of those elements, without extraneous aid.

I claim:

An improvement in wheels of the type having removable dual rims, comprising a hub, long spokes radiating from the hub on one side of the wheel, and pairs of short spokes radiating from the hub on the opposite side of the wheel, each of the long spokes having a pair of integral rim seats, said short spokes having their outwardly facing surfaces inclined circumferentially, the outer surfaces of the spokes of one pair being inclined in the opposite direction to the surfaces of the spokes of the other pair, a series of wedges on said outer surfaces, each of said wedges having a pair of rim seats, a pair of rims mounted on the integral rim seats of the long spokes and on said wedges, and means for moving said wedges circumferentially on said inclined outer surfaces against said rims to clamp the rims radially upon the wheel.

In testimony whereof I have hereunto affixed my signature.

CHRISTIAN J. HUG.